(12) United States Patent
Tuckey et al.

(10) Patent No.: US 8,262,107 B2
(45) Date of Patent: Sep. 11, 2012

(54) STROLLER AND RELATED VIBRATION-ABSORBING MECHANISM

(75) Inventors: Peter R. Tuckey, Amsterdam Zuidoost (NL); Jonathan Mountz, Amsterdam Zuidoost (NL)

(73) Assignee: NUNA International B.V., Erp (NL)

( * ) Notice: Subject to any disclaimer, the term of this patent is extended or adjusted under 35 U.S.C. 154(b) by 165 days.

(21) Appl. No.: 12/877,116

(22) Filed: Sep. 8, 2010

(65) Prior Publication Data
US 2011/0057404 A1 Mar. 10, 2011

Related U.S. Application Data

(60) Provisional application No. 61/241,034, filed on Sep. 10, 2009.

(51) Int. Cl.
*B62B 9/18* (2006.01)
(52) U.S. Cl. .................... 280/47.18; 280/47.41; 267/5
(58) Field of Classification Search ............ 280/33.993, 280/47.38, 47.41, 639, 642–644, 647–650, 280/658, 43.18; 267/5, 226, 289, 290, 291; 16/DIG. 36, 44
See application file for complete search history.

(56) References Cited

U.S. PATENT DOCUMENTS

| | | | | | |
|---|---|---|---|---|---|
| 1,200,022 | A | * | 10/1916 | Price | ................................ 267/29 |
| 4,491,335 | A | * | 1/1985 | Evron | ........................ 280/47.41 |
| 4,637,093 | A | * | 1/1987 | Kassai | ........................... 16/35 R |
| 5,301,931 | A | * | 4/1994 | Bigo | .................................. 267/5 |
| 5,364,119 | A | | 11/1994 | Leu | |
| 5,676,355 | A | | 10/1997 | Hayashi | |
| 6,070,863 | A | * | 6/2000 | Pradel | ........................... 267/221 |
| 6,318,750 | B1 | * | 11/2001 | Lan | ............................... 280/642 |
| 6,561,537 | B1 | * | 5/2003 | Chen | ............................. 280/648 |
| 6,739,616 | B2 | * | 5/2004 | Lin | ................................. 280/642 |
| 7,677,539 | B2 | * | 3/2010 | Adoline | ........................ 267/168 |
| 2003/0201617 | A1 | | 10/2003 | Hartenstine | |

FOREIGN PATENT DOCUMENTS

| | | |
|---|---|---|
| CN | 1420824 A | 5/2003 |
| DE | 37 14363 A1 | 11/1987 |
| DE | 201 12 112 U1 | 12/2001 |
| DE | 103 18 901 A1 | 11/2003 |
| EP | 1 624 219 A1 | 2/2006 |
| GB | 245565 | 1/1926 |

* cited by examiner

*Primary Examiner* — John Walters
*Assistant Examiner* — James Triggs
(74) *Attorney, Agent, or Firm* — Winston Hsu; Scott Margo

(57) ABSTRACT

A stroller includes a chassis, a main body disposed on the chassis, and a first vibration-absorbing mechanism including a first rod structure, a first sleeve structure, a first inner elastic part, and a first outer elastic part. The first rod structure is connected to a side of the chassis. The first sleeve structure is connected to the main body and movably sleeves the first rod structure. The first inner elastic part abuts against the first rod structure and the first sleeve structure. When the first vibration-absorbing mechanism is in a first use state, the first outer elastic part is in contact with one of the first sleeve structure and the first rod structure. When the first rod structure slides toward the first sleeve structure over a specific distance, two ends of the first outer elastic part abut against the first sleeve structure and the first rod structure, respectively.

24 Claims, 6 Drawing Sheets

STROLLER AND RELATED VIBRATION-ABSORBING MECHANISM

CROSS REFERENCE TO RELATED APPLICATIONS

This application claims the benefit of U.S. Provisional Application No. 61/241,034, which was filed on Sep. 10, 2009 and is incorporated herein by reference.

BACKGROUND OF THE INVENTION

1. Field of the Invention

The present invention relates to a stroller and a related vibration-absorbing mechanism, and more particularly, to a stroller and a related vibration-absorbing mechanism capable of adapting to different level of roughness of road.

2. Description of the Prior Art

A conventional stroller is not like bicycles, motorcycles or cars which are equipped with a vibration-absorbing mechanism. Thus, vibration transited from the wheels of the stroller makes a baby sitting thereon feel uncomfortable easily when the stroller is moving on a bumpy road.

In order to solve the said problem, there have been some premium strollers equipped with a vibration-absorbing mechanism. A conventional design is to dispose a vibration-absorbing spring in a support post of the stroller. The vibration-absorbing spring can absorb vibration transited from the wheels by its elasticity, and accordingly, it provides a baby sitting on the stroller with a better sense of sitting while the stroller is moving.

However, a conventional vibration-absorbing spring is not sufficient for different kinds of road situations. For example, if a vibration-absorbing spring with a high stiffness constant is adopted, a slightly bumpy road may cause significant vibration. On the other hand, if a vibration-absorbing spring with a high elastic constant is adopted instead, this spring may lose its vibration-absorbing efficacy when the stroller moves on an extremely bumpy road.

In summary, the said vibration-absorbing design cannot meet different vibration-absorbing requirements of the stroller in different road situations.

SUMMARY OF THE INVENTION

The present invention provides a vibration-absorbing mechanism for a stroller, and the stroller includes a chassis and a main body disposed on the chassis. The vibration-absorbing mechanism includes a rod structure connected to a side of the chassis; a sleeve structure connected to the main body and movably sleeving the rod structure; an inner elastic part abutting against the rod structure and the sleeve structure respectively; and an outer elastic part disposed around the inner elastic part and located between the sleeve structure and the rod structure; wherein when the vibration-absorbing mechanism is in a first use state, the outer elastic part is in contact with one of the sleeve structure and the rod structure; when the rod structure slides toward the sleeve structure over a specific distance, the vibration-absorbing mechanism switches from the first use state to a second use state, and two ends of the outer elastic part abut against the sleeve structure and the rod structure respectively.

The present invention further provides a stroller including a chassis; a main body disposed on the chassis; and a first vibration-absorbing mechanism. The first vibration-absorbing mechanism includes a first rod structure connected to a side of the chassis; a first sleeve structure connected to the main body and movably sleeving the first rod structure; a first inner elastic part abutting against the first rod structure and the first sleeve structure respectively; and a first outer elastic part disposed around the first inner elastic part and located between the first sleeve structure and the first rod structure; wherein when the first vibration-absorbing mechanism is in a first use state, the first outer elastic part is in contact with one of the first sleeve structure and the first rod structure; when the first rod structure slides toward the first sleeve structure over a specific distance, the first vibration-absorbing mechanism switches from the first use state to a second use state, and two ends of the first outer elastic part abut against the first sleeve structure and the first rod structure respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
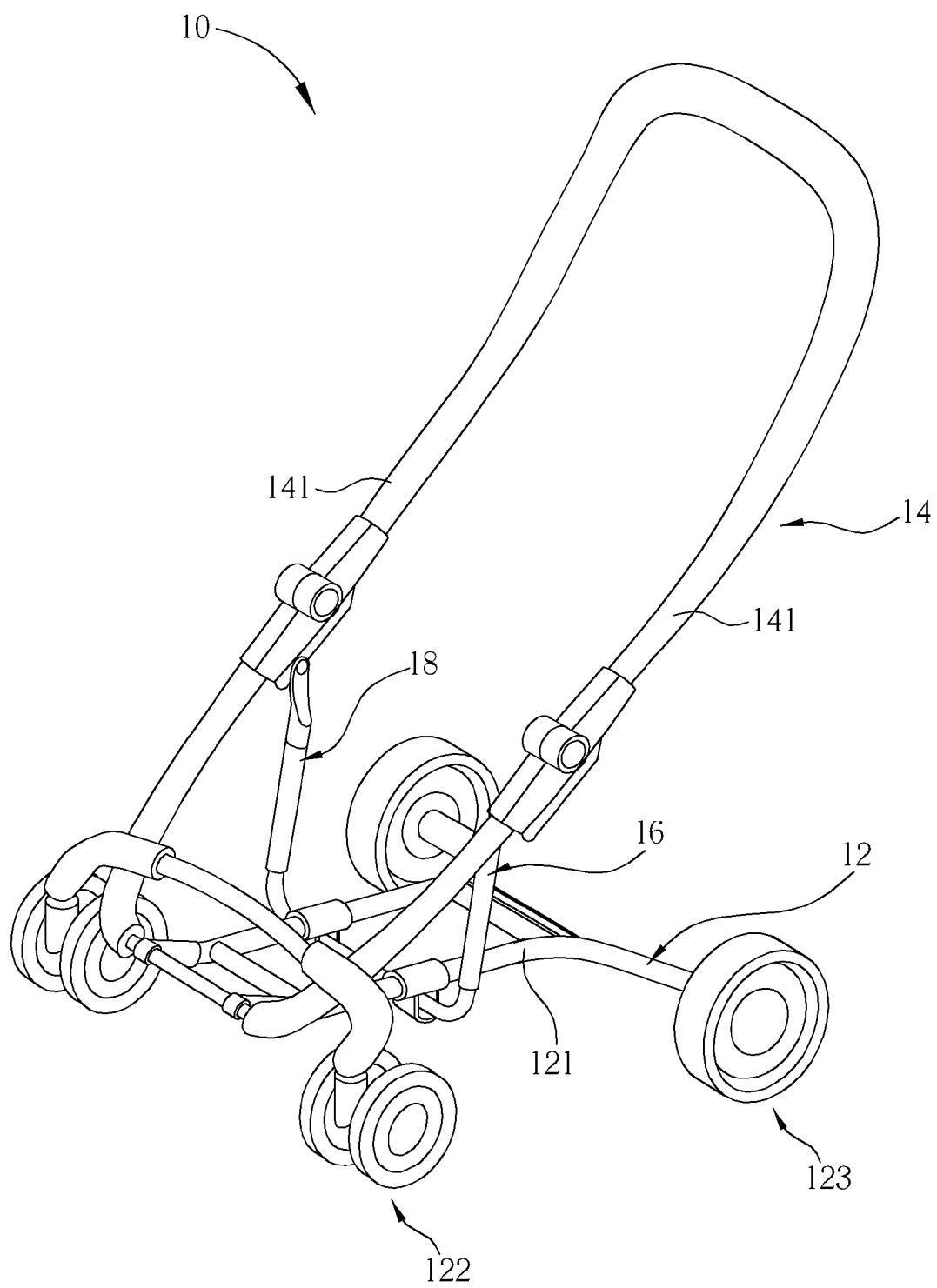
FIG. 1 is a diagram of a stroller according to a preferred embodiment of the present invention.

Please refer to FIG. 1, which is a diagram of a stroller 10 according to a preferred embodiment of the present invention. The stroller 10 includes a chassis 12, a main body 14 (only partially shown in FIG. 1), a first vibration-absorbing mechanism 16 and a second vibration-absorbing mechanism 18. As shown in FIG. 1, the chassis 12 includes a supporting frame 121, a front wheel set 122 and a rear wheel set 123. The chassis 12 is used for supporting the main body 14 and is moved with the main body 14 via the front wheel set 122 and the rear wheel set 123. The main body 14 is disposed on the chassis 12, and the main body 14 is an assembly of the structures of the stroller 10 other than the chassis 12, the first vibration-absorbing mechanism 16 and the second vibration-absorbing mechanism 18.

Figure 2:
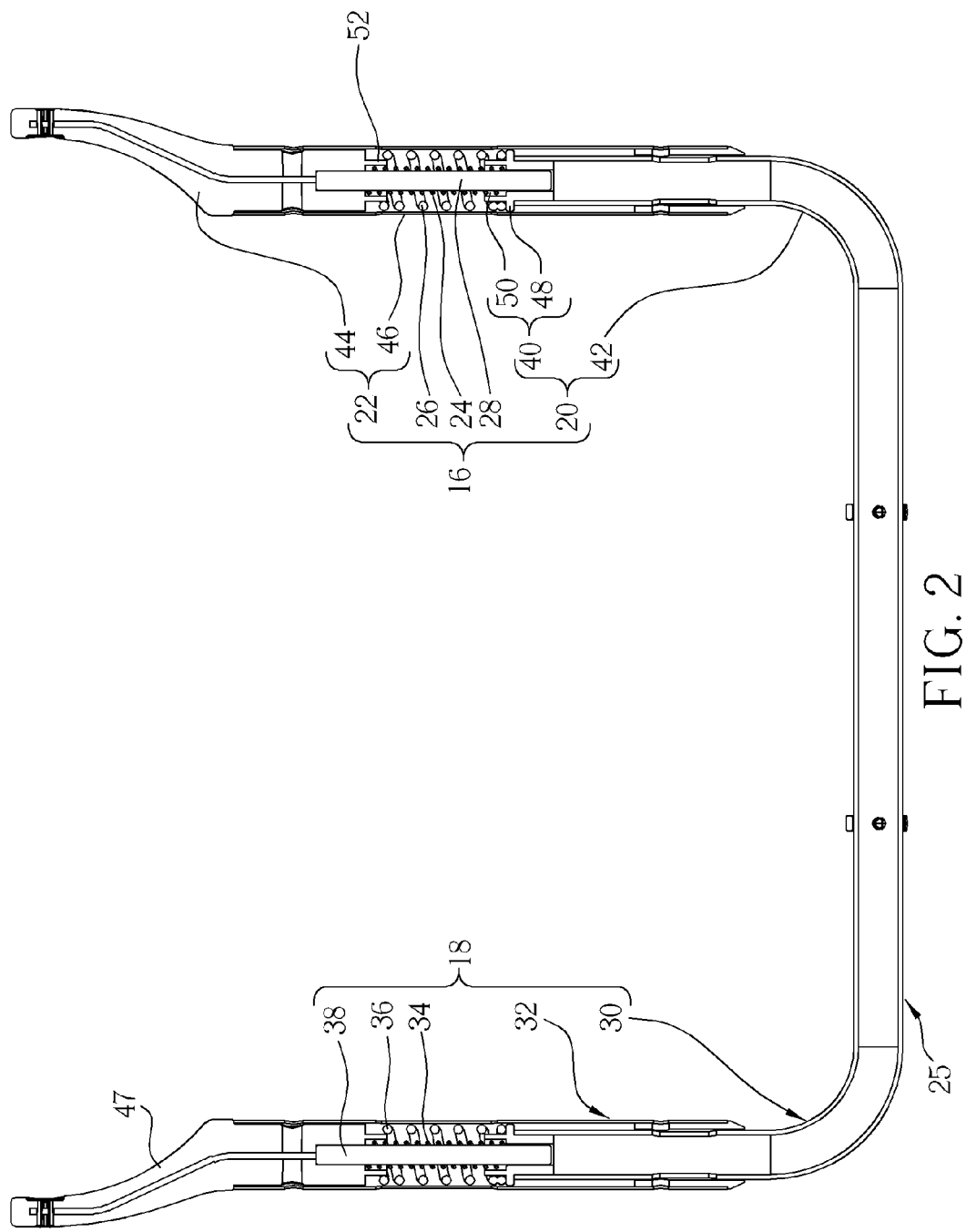
FIG. 2 is a section diagram of a first vibration-absorbing mechanism and a second vibration-absorbing mechanism in FIG. 1.

Please refer to FIG. 1 and FIG. 2. FIG. 2 is a section diagram of the first vibration-absorbing mechanism 16 and the second vibration-absorbing mechanism 18 in FIG. 1. As shown in FIG. 1 and FIG. 2, the first vibration-absorbing mechanism 16 includes a first rod structure 20, a first sleeve structure 22, a first inner elastic part 24, a first outer elastic part 26 and a first guiding rod 28. The second vibration-absorbing mechanism 18 includes a second rod structure 30, a second sleeve structure 32, a second inner elastic part 34, a second outer elastic part 36 and a second guiding rod 38. In this embodiment, the first rod structure 20 is connected to the second rod structure 30 so as to form a U-shaped rod structure 25 (as shown in FIG. 2) cooperatively with the second rod structure 30. The first sleeve structure 22 and the second sleeve structure 32 are connected to both sides of the main body 14 (e.g. being connected to a handle rod 141), respectively, and movably sleeve the first rod structure 20 and the second rod structure 30, respectively. In such a manner, the first vibration-absorbing mechanism 16 and the second vibration-absorbing mechanism 18 can support the main body 14 cooperatively with the chassis 12 by disposing the U-shaped rod structure 25 formed by the first rod structure 20 and the second rod structure 30 pivoted on the supporting frame 121.

Figure 3:
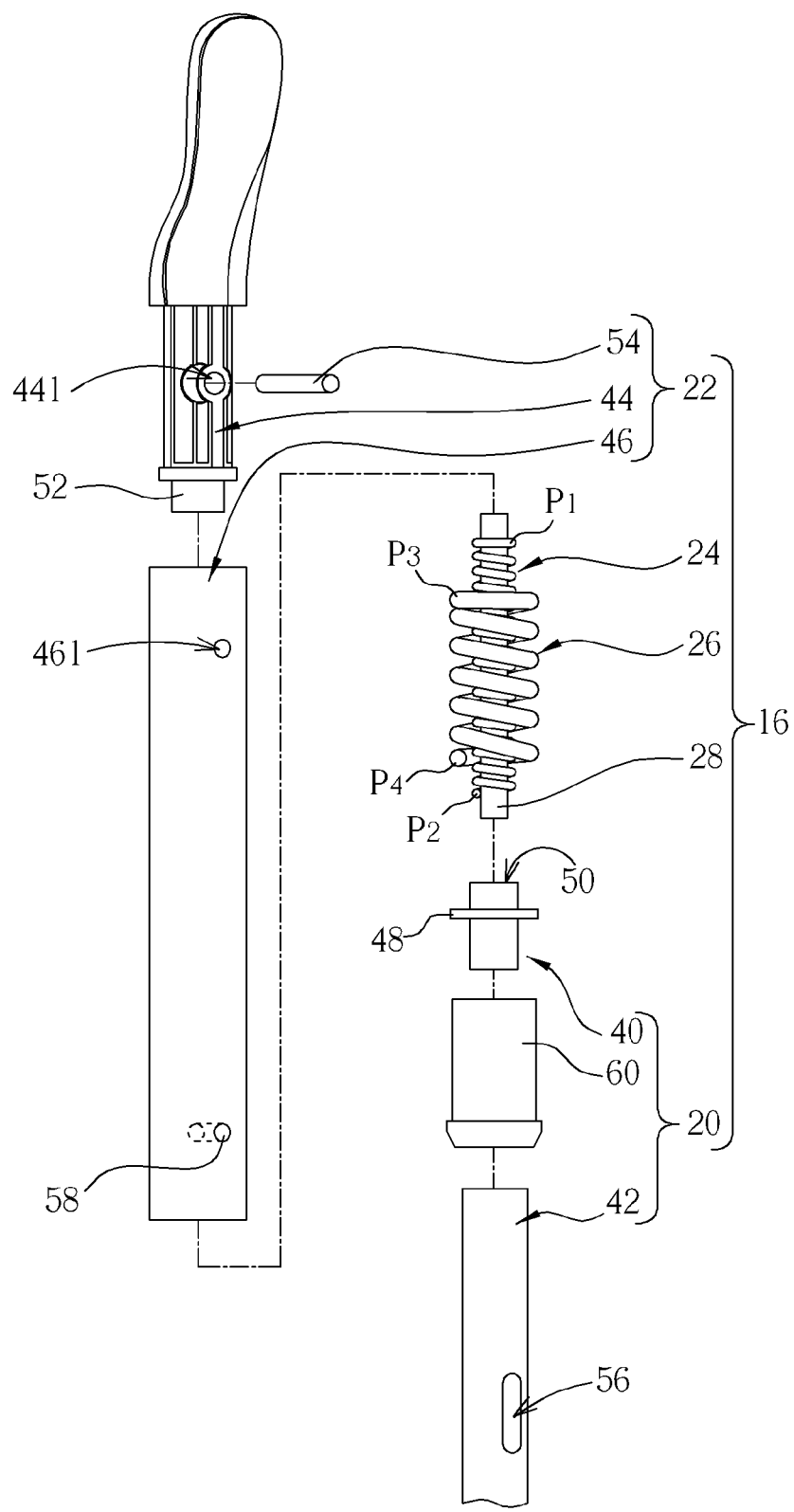
FIG. 3 is an exploded diagram of the first vibration-absorbing mechanism in FIG. 2.

Please refer to FIG. 3, which is an exploded diagram of the first vibration-absorbing mechanism 16 in FIG. 2. As shown in FIG. 3, the said first inner elastic part 24 abuts against the first rod structure 20 and the first sleeve structure 22, respectively. The first outer elastic part 26 is disposed in the first sleeve structure 22 and is disposed around the first inner elastic part 24. The first outer elastic part 26 is used for abutting against an upper abutting base 44 of the first sleeve structure 22 after the first rod structure 20 slides toward the first sleeve structure 22. In this embodiment, the first inner elastic part 24 and the first outer elastic part 26 are preferably springs, wherein an elastic constant of the first inner elastic part 24 is preferably smaller than that of the first outer elastic part 26.

Similarly, the said second inner elastic part 34 abuts against the second rod structure 30 and the second sleeve structure 32, respectively. The second outer elastic part 36 is disposed in the second sleeve structure 32 and is disposed around the second inner elastic part 34. The second outer elastic part 36 is used for abutting against an upper abutting base 47 of the second sleeve structure 32 after the second support rod structure slides toward the second sleeve structure 32. In this embodiment, the second inner elastic part 34 and the second outer elastic part 36 are preferably springs, wherein an elastic constant of the second inner elastic part 34 is preferably smaller than that of the second outer elastic part 36.

More detailed description for the structural relationship among the first inner elastic part 24, the first outer elastic part 26, the first rod structure 20 and the first sleeve structure 22 is provided herein. As for the structural relationship among the second inner elastic part 34, the second outer elastic part 36, the second rod structure 30 and the second sleeve structure 32, it can be reasoned by analogy according to the following description and the related description is therefore omitted herein since the second vibration-absorbing mechanism 18 is symmetric to the first vibration-absorbing mechanism 16 in this embodiment.

Please refer to FIG. 2 and FIG. 3. The first rod structure 20 includes a lower abutting base 40 and a rod 42 (only partially shown) connected to the lower abutting base 40. The first sleeve structure 22 includes the upper abutting base 44 and a sleeve 46. The sleeve 46 is connected to the upper abutting base 44 and movably sleeves the rod 42 and the lower abutting base 40. In this embodiment, the rod 42 and the upper abutting base 44 are pivotally connected to the chassis 12 and the main body 14, respectively. In other words, the stroller 10 is foldable by the design of the U-shaped rod structure 25 being pivotally connected to the chassis 12 and the main body 14.

Figure 4:
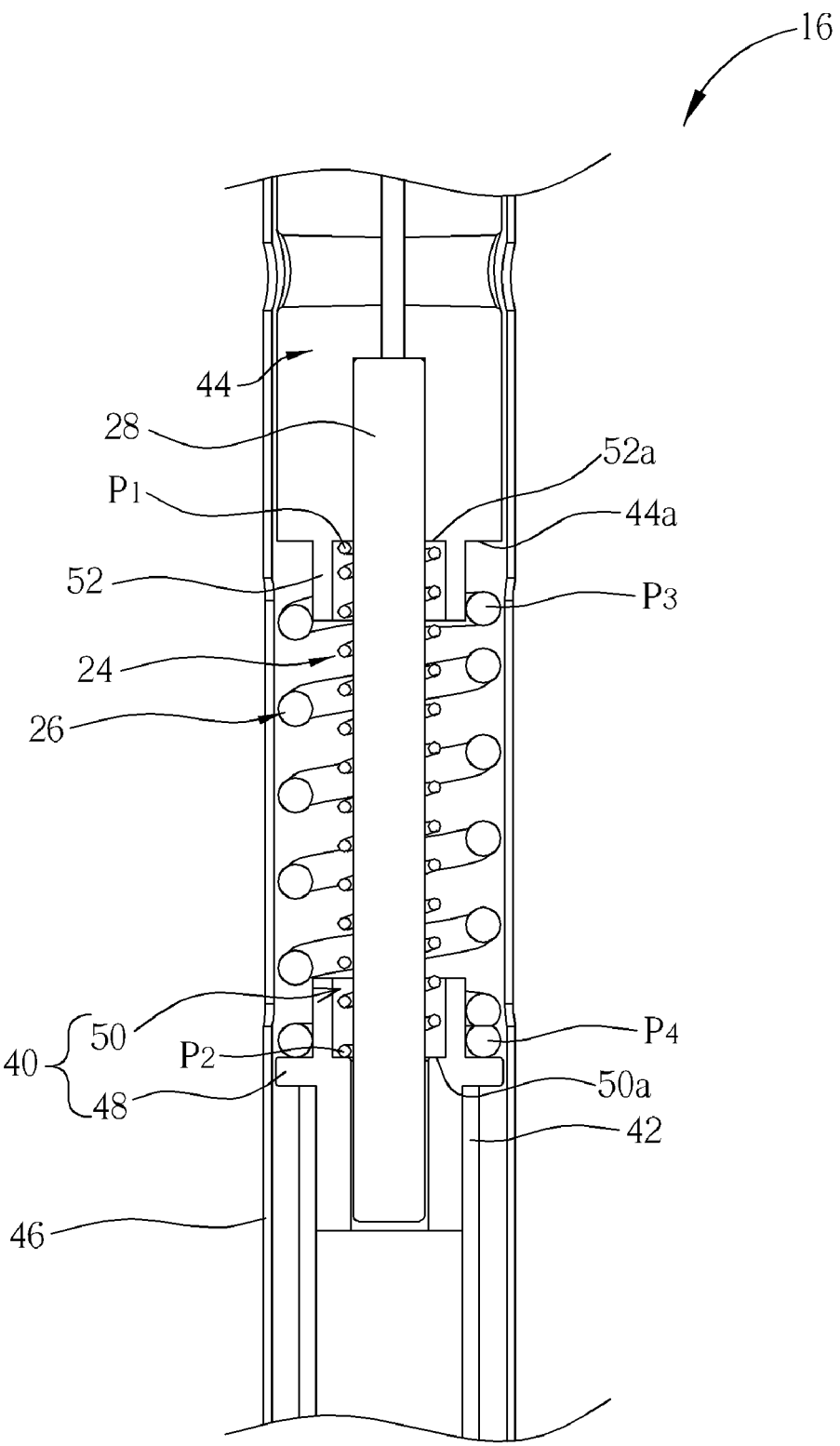
FIG. 4 is a partial enlarged section diagram of the first vibration-absorbing mechanism in FIG. 1.

Please refer to FIG. 3 and FIG. 4. FIG. 4 is a partial enlarged section diagram of the first vibration-absorbing mechanism 16 in FIG. 1. As shown in FIG. 3 and FIG. 4, a peripheral surface of the lower abutting base 40 has a ring-shaped rib 48, a containing groove 50 is formed in the lower abutting base 40, and the upper abutting base 44 has a hollow protruding structure 52. The first guiding rod 28 is inserted into and tightly fit with the upper abutting base 44 and the lower abutting base 40. A first end $P_1$ and a second end $P_2$ of the first inner elastic part 24 abut against an inner shoulder portion 52a of the hollow protruding portion 52 and an inner shoulder portion 50a of the containing groove 50, respectively. A first end $P_3$ of the first outer elastic part 26 is disposed around the hollow protruding portion 52 and abuts against an outer shoulder portion 44a formed on a periphery of a contact surface of the upper abutting base 44, and a second end $P_4$ of the first outer elastic part 26 is used for abutting against the ring-shaped rib 48. In other words, in this embodiment, a specific distance that the first rod structure 20 slides toward the first sleeve structure 22 is substantially equal to a distance between the first end $P_3$ of the first outer elastic part 26 and the outer shoulder portion 44a before the rod 42 slides toward the sleeve 46.

As for the first guiding rod 28, it is connected to the upper abutting base 44 and the lower abutting base 40 and is disposed through the first inner elastic part 24. The first guiding rod 28 is used for guiding a direction of elastic deformation of the first inner elastic part 24 and the first outer elastic part 26. That is, during the first inner elastic part 24 and the first outer elastic part 26 are compressed by an external force, the first guiding rod 28 can prevent the first inner elastic part 24 and the first outer elastic part 26 from being bent, so as to make the first inner elastic part 24 and the first outer elastic part 26 capable of performing simple harmonic motion along the guiding rod 28. Therefore, the vibration-absorbing efficiency of the first inner elastic part 24 and the first outer elastic part 26 can be increased accordingly.

Furthermore, as shown in FIG. 3, the first sleeve structure 22 further includes a rivet 54. The rivet 54 is used for passing through a hole 461 of the sleeve 46 and a hole 441 of the upper abutting base 44 sequentially for fixing the upper abutting base 44 onto the sleeve 46. In addition, as shown in FIG. 3, a guiding slot 56 is formed on the rod 42, the sleeve 46 has a sliding pin 58 protruding inwardly, and the first rod structure 20 further includes an auxiliary sheathing part 60. When the sleeve 46 sleeves the rod 42, the sliding pin 58 is disposed through the guiding slot 56 for guiding the sleeve 46 to slide along the rod 42. The auxiliary sheathing part 60 is disposed between the sleeve 46 and the rod 42 for preventing the rod 42 from shaking during the sleeve 46 slides relative to the rod 42, so as to make the rod 42 slide relative to the sleeve 46 more smoothly.

Since the second vibration-absorbing mechanism 18 is symmetric to the first vibration-absorbing mechanism 16 in this embodiment, the vibration-absorbing principle of the second vibration-absorbing mechanism 18 is the same as that of the first vibration-absorbing mechanism 16. Accordingly, the following description is only illustrated in detail for the first vibration-absorbing mechanism 16. As for the vibration-absorbing principle of the second vibration-absorbing mechanism 18, it can be reasoned by analogy, and the related description is therefore omitted herein.

Please refer to FIG. 4. First of all, when the stroller 10 is moving on a mildly bumpy road, the vibration energy received by the chassis 12 of the stroller 10 drives the rod 42 to slide upwardly relative to the sleeve 46. Thus, the chassis 12 in contact with the road may vibrate upwardly and downwardly slightly. At this time, the first elastic part 24 is compressed accordingly when the rod 42 slides relative to the sleeve 46 since the first end $P_1$ and the second end $P_2$ of the first inner elastic part 24 abut against the inner shoulder portion 52a of the hollow protruding portion 52 and the inner shoulder portion 50a of the containing groove 50, respectively (as shown in FIG. 4). At the same time, one of the first end $P_3$ and the second end $P_4$ of the first outer elastic part 26 is in contact with the first sleeve structure 22 or the first rod structure 20. In this embodiment, it can be defined as a first use state of the first vibration-absorbing mechanism 16, and the second end $P_4$ of the first outer elastic part 26 is preferably in contact with the ring-shaped rib 48 of the lower abutting base 40. When the first inner elastic part 24 is compressed, the said vibration energy is transformed into elastic potential energy stored in the first inner elastic part 24. Thus, since the said vibration can be absorbed by elastic deformation of the first inner elastic part 24, the stroller 10 can make a baby sitting thereon feel more comfortable while the stroller is moving.

On the other hand, if the vibration energy received by the chassis 12 of the stroller 10 is large enough when the stroller 10 is moving on a wildly bumpy road, not only the first inner elastic part 24 can be compressed accordingly, but the rod 42 can also be driven to slide upwardly to make the outer shoulder portion 44a of the upper abutting base 44 abut against the first end $P_3$ of the first outer elastic part 26. At this time, since the second end $P_4$ of the first outer elastic part 26 also abuts against the ring-shaped rib 48 of the lower abutting base 40, the first outer elastic part 26 starts to be compressed. In this embodiment, it can be defined that the first vibration-absorbing mechanism 16 switches from the said first use state to a second use state. In the second use state, part of the said vibration energy is absorbed by the elastic deformation of the first inner elastic part 24, and the rest of the said vibration energy is further absorbed by the elastic deformation of the first outer elastic part 26. The detailed description is provided as follows.

As shown in FIG. 4, before the rod 42 slides toward the first sleeve structure 22 so as to make the outer shoulder portion 44a of the upper abutting base 44 abut the first end $P_3$ of the first outer elastic part 26, the first end $P_1$ and the second end $P_2$ of the first inner elastic part 24 have already abutted against the inner shoulder portion 52a of the hollow protruding portion 52 and the inner shoulder portion 50a of the containing groove 50, respectively. In such a manner, part of vibration energy received by the stroller 10 can be absorbed by the said elastic deformation of the first inner elastic part 24 with the smaller elastic constant.

Figure 5:
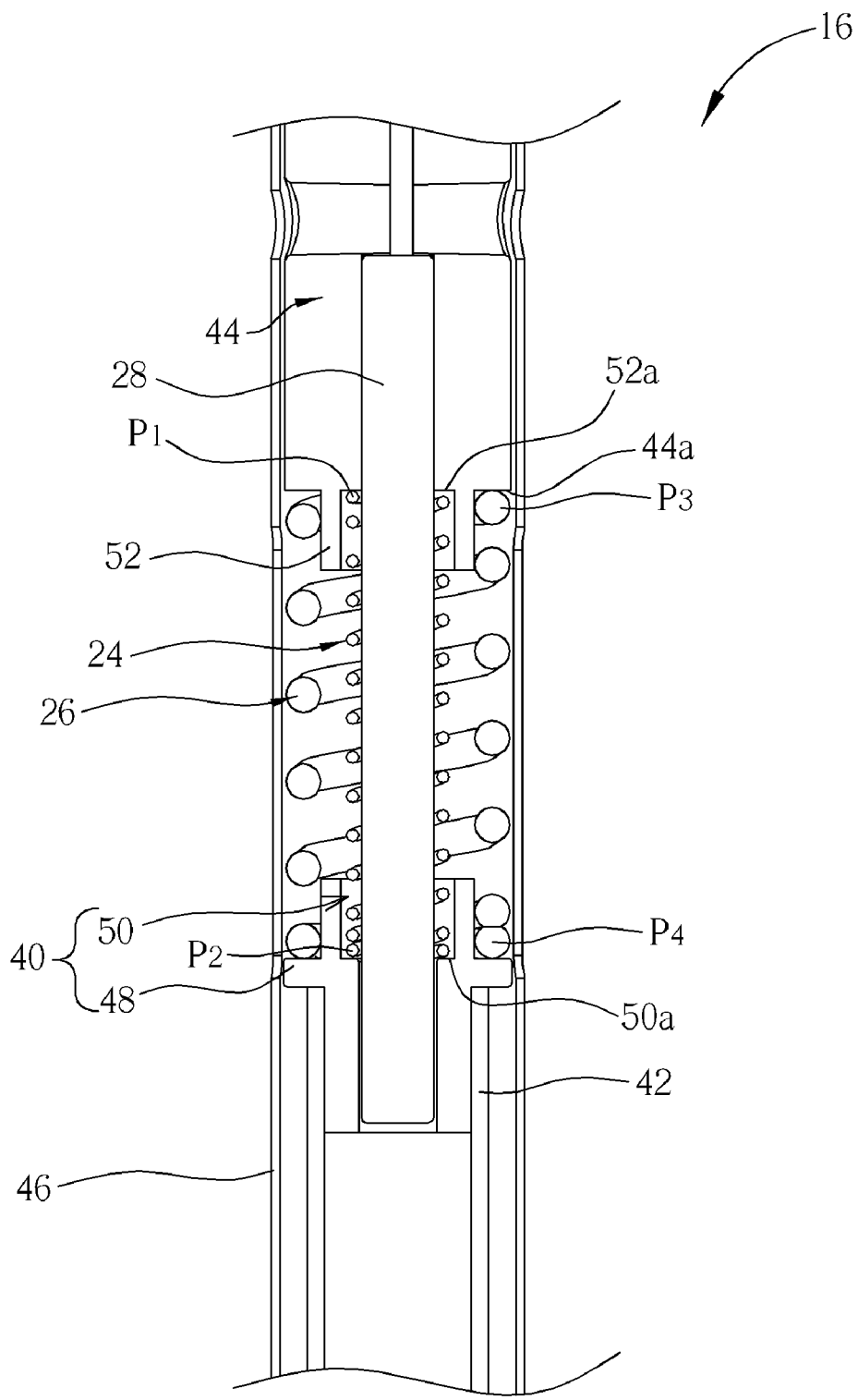
FIG. 5 is an enlarged section diagram of a first end of a first outer elastic part abutting against an upper abutting base in FIG. 4.

Next, please refer to FIG. 5, which is an enlarged section diagram of the first end $P_3$ of the first outer elastic part 26 abutting against the upper abutting base 44 in FIG. 4. As shown in FIG. 5, after the said vibration energy drives the rod 42 to slide toward the first sleeve structure 22 so as to make the outer shoulder portion 44a abut against the first end $P_3$ of the first outer elastic part 26, the lower abutting base 40 can compress the first inner elastic part 24 and the first outer elastic part 26 simultaneously. In such a manner, part of the said vibration energy can be absorbed by the elastic deformation of the first inner elastic part 24, and the rest of the said vibration energy is effectively absorbed by the elastic deformation of the first outer elastic part 26 with the larger elastic constant. Thus, the vibration-absorbing efficiency of the first vibration-absorbing mechanism 16 can be greatly enhanced for the wildly bumpy road. It should be noticed that disposal of the first outer elastic part 26 is not limited to the said embodiment. In other words, the first outer elastic part 26 can be connected to the upper abutting base 44 instead, and distant from the lower abutting chassis 48 in the first use state.

In summary, the stroller 10 is capable of absorbing various vibrations corresponding to various kinds of road situations by utilizing inner/outer springs with different elastic constants in the first vibration-absorbing mechanism 16 and the second vibration-absorbing mechanism 18. In other words, no matter moving on a mildly or wildly bumpy road, the stroller 10 can utilize the first inner elastic part 24 and the first outer elastic part 26 to abut against the sleeve 46 and the rod 42 for absorbing vibration effectively. Thus, the purpose of meeting different vibration-absorbing requirements of the stroller 10 in different road situations is achieved.

It should be noticed that the structural designs of the first rod structure 20 and the second rod structure 30 are not limited to the U-shaped support rod structure mentioned in the said embodiment. In other words, the first rod structure 20 and the second rod structure 30 can be independent parts disposed on two sides of the stroller 10, respectively. In addition, the vibration-absorbing design mentioned above can be only applied to one side of the stroller 10, and the other side can instead utilize another type of vibration-absorbing mechanism. As for which design is utilized, it depends on the practical application of the stroller 10.

Figure 6:
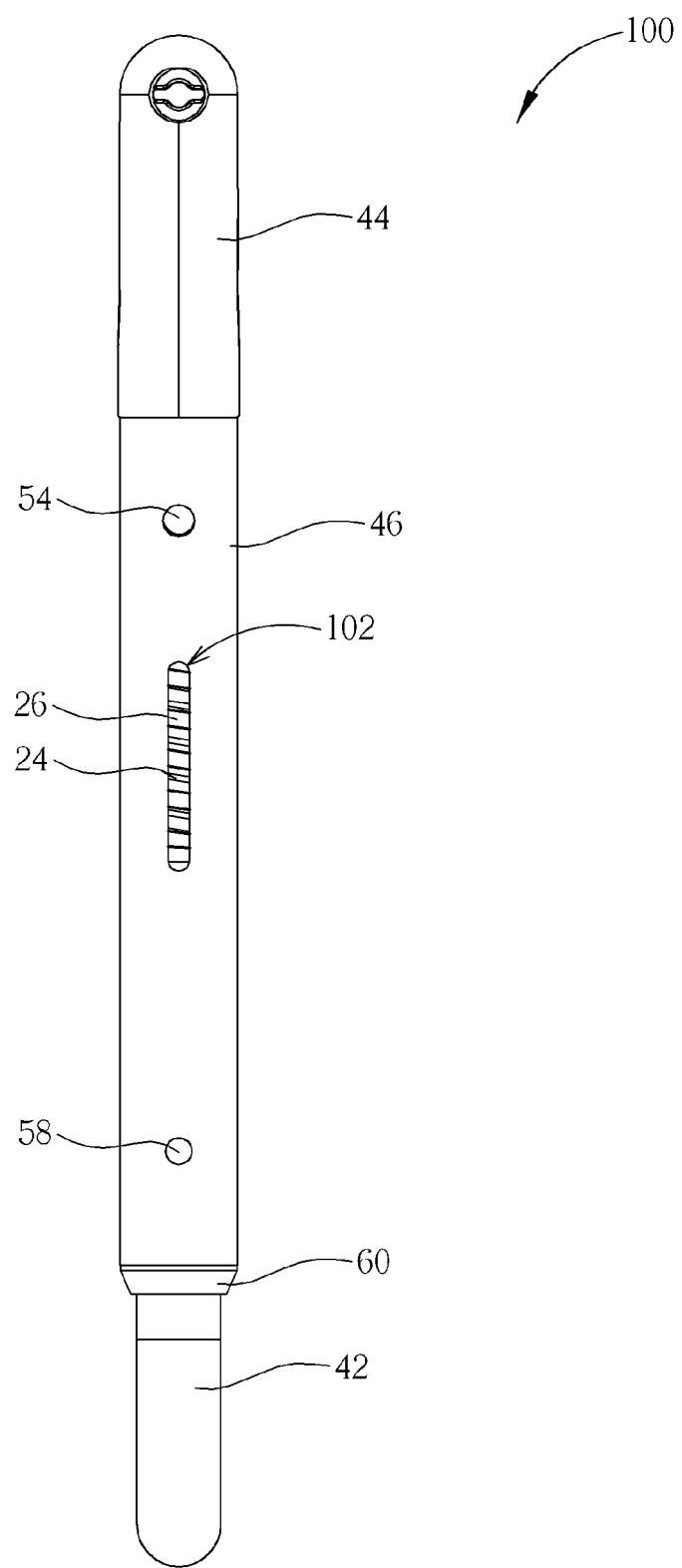
FIG. 6 is a side view of a first vibration-absorbing mechanism according to another preferred embodiment of the present invention.

Finally, please refer to FIG. 6, which is a side view of a first vibration-absorbing mechanism 100 according to another preferred embodiment of the present invention. Components both mentioned in this embodiment and the said embodiment represent components with similar functions or structures, and the related description is therefore omitted herein. The main difference between the first vibration-absorbing mechanism 100 and the first vibration-absorbing mechanism 16 is the structural design of the sleeve. As shown in FIG. 6, a strip-shaped slot 102 is formed on a peripheral surface of the sleeve 46 corresponding to the first inner elastic part 24 and the first outer elastic part 26. In such a manner, the stroller 10 allows the user to clearly view vibration-absorbing situations of the first inner elastic part 24 and the first outer elastic part 26 in the first vibration-absorbing mechanism 100 by the strip-shaped hole 102 exposing at least one of the inner elastic part 24 and the outer elastic part 26, so that the user can see the inner structure of the vibration-absorbing mechanism such that using the stroller 10 with relief. It should be noticed that the said design for exposing the inner structure of vibration-absorbing mechanism is not limited to FIG. 6, meaning that the first vibration-absorbing mechanism 100 can utilize other design having the same effect, such as modification of shape of the slot, or the sleeve 46 being made of transparent plastic material.

Compared with the prior art, in which only one elastic part is disposed in a support post of a stroller for absorbing vibration, the stroller of the present invention is capable of absorbing various vibrations corresponding to various kinds of road situations by abutting of the inner/outer springs with different elastic constants against the sleeve and the rod. In other words, the stroller of the present invention can selectively use the inner elastic part to absorb smaller vibration or use the inner elastic part and the outer elastic part simultaneously to absorb larger vibration according to different road situations. Accordingly, the present invention can meet different vibration-absorbing requirements of the stroller in different road situations, so as to provide a baby sitting thereon with comfort.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A vibration-absorbing mechanism for a stroller, the stroller comprising a chassis and a main body disposed on the chassis, the vibration-absorbing mechanism comprising:
   a rod structure connected to a side of the chassis;
   a sleeve structure connected to the main body and movably sleeving the rod structure;
   an inner elastic part abutting against the rod structure and the sleeve structure respectively; and an outer elastic part disposed around the inner elastic part and located between the sleeve structure and the rod structure;
wherein when the vibration-absorbing mechanism is in a first use state, the outer elastic part is in contact with one of the sleeve structure and the rod structure;
when the rod structure slides toward the sleeve structure over a specific distance, the vibration-absorbing mechanism switches from the first use state to a second use state, and two ends of the outer elastic part abut against the sleeve structure and the rod structure respectively.

2. The vibration-absorbing mechanism of claim 1, wherein the rod structure comprises a lower abutting base and a rod connected to the lower abutting base, the sleeve structure comprises a upper abutting base and a sleeve connected to the upper abutting base and movably sleeving the rod and the lower abutting base, the inner elastic part is disposed between the upper abutting base and the lower abutting base, and the outer elastic part abuts against the upper abutting base and the lower abutting base cooperatively with the inner elastic part when the rod slides toward the sleeve over a specific distance.

3. The vibration-absorbing mechanism of claim 2, wherein a peripheral surface of the lower abutting base has a ring-shaped rib, an outer shoulder portion is formed on a periphery of a contact surface of the upper abutting base, a containing groove is formed in the lower abutting base, the upper abutting base has a hollow protruding structure, a first end and a second end of the inner elastic part abut against inside the hollow protruding structure and the containing groove respectively, a second end of the outer elastic part abuts against the ring-shaped rib, and a first end of the outer elastic part sheathes the hollow protruding structure and abuts against the outer shoulder portion when the rod slides toward the sleeve over the specific distance.

4. The vibration-absorbing mechanism of claim 2 further comprising a guiding rod connected to the upper abutting base and the lower abutting base and disposed through the inner elastic part.

5. The vibration-absorbing mechanism of claim 2, wherein the sleeve structure further comprises a rivet penetrating the upper abutting base and the sleeve for fixing the upper abutting base onto the sleeve.

6. The vibration-absorbing mechanism of claim 2, wherein a guiding slot is formed on the rod, the sleeve has a sliding pin, and the sliding pin is disposed in the guiding slot for guiding the sleeve to slide relative to the rod.

7. The vibration-absorbing mechanism of claim 2, wherein the sleeve structure further comprises an auxiliary sheathing part disposed between the sleeve and the rod.

8. The vibration-absorbing mechanism of claim 2, wherein a strip-shaped slot is formed on a peripheral surface of the sleeve, and the strip-shaped slot exposes at least one of the inner elastic part and the outer elastic part.

9. The vibration-absorbing mechanism of claim 2, wherein the sleeve is made of transparent plastic material.

10. The vibration-absorbing mechanism of claim 2, wherein the rod structure is pivotally connected to the chassis and the sleeve structure is pivotally connected to the main body.

11. The vibration-absorbing mechanism of claim 1, wherein an elastic constant of the inner elastic part is smaller than that of the outer elastic part.

12. A stroller comprising:
a chassis;
a main body disposed on the chassis; and
a first vibration-absorbing mechanism comprising:
a first rod structure connected to a side of the chassis;
a first sleeve structure connected to the main body and movably sleeving the first rod structure;
a first inner elastic part abutting against the first rod structure and the first sleeve structure respectively; and
a first outer elastic part disposed around the first inner elastic part and located between the first sleeve structure and the first rod structure;
wherein when the first vibration-absorbing mechanism is in a first use state, the first outer elastic part is in contact with one of the first sleeve structure and the first rod structure;
when the first rod structure slides toward the first sleeve structure over a specific distance, the first vibration-absorbing mechanism switches from the first use state to a second use state, and two ends of the first outer elastic part abut against the first sleeve structure and the first rod structure respectively.

13. The stroller of claim 12, wherein the first rod structure comprises a lower abutting base and a rod connected to the lower abutting base, the first sleeve structure comprises an upper abutting base and a sleeve connected to the upper abutting base and movably sleeving the rod and the lower abutting base, the first inner elastic part is disposed between the upper abutting base and the lower abutting base respectively, and the outer elastic part abuts against the upper abutting base and the lower abutting base cooperatively with the first inner elastic part when the rod slides from the rod toward the sleeve over a specific distance.

14. The stroller of claim 13, wherein a peripheral surface of the lower abutting base has a ring-shaped rib, an outer shoulder portion is formed on a periphery of a contact surface of the upper abutting base, a containing groove is formed in the lower abutting base, the upper abutting base has a hollow protruding structure, a first end and a second end of the first inner elastic part abut against inside the hollow protruding structure and the containing groove respectively, a second end of the first outer elastic part abuts against the ring-shaped rib, a first end of the first outer elastic part sheathes the hollow protruding structure and abuts against the outer shoulder portion, when the rod slides toward the sleeve over the specific distance.

15. The stroller of claim 13, wherein the first vibration-absorbing mechanism further comprises a first guiding rod connected to the upper abutting base and the lower abutting base and disposed through the first inner elastic part.

16. The stroller of claim 13, wherein the first sleeve structure further comprises a rivet part penetrating the upper abutting base and the sleeve for fixing the upper abutting base onto the sleeve.

17. The stroller of claim 13, wherein a guiding slot is formed on the first rod, the sleeve has a sliding pin, and the sliding pin is disposed in the guiding slot and for guiding the sleeve to slide relative to the rod.

18. The stroller of claim 13, wherein the first sleeve structure further comprises an auxiliary sheathing part disposed between the sleeve and the rod.

19. The stroller of claim 13, wherein a strip-shaped slot is formed on a peripheral surface of the sleeve, and the strip-shaped slot exposes at least one of the first inner elastic part and the first outer elastic part.

20. The stroller of claim 13, wherein the sleeve is made of transparent plastic material.

21. The stroller of claim 13, wherein the first rod structure is pivotally connected to the chassis and the first sleeve structure is pivotally connected to the main body.

22. The stroller of claim 12, wherein an elastic constant of the first inner elastic part is smaller than that of the first outer elastic part.

23. The stroller of claim 12 further comprising a second vibration-absorbing mechanism, the second vibration-absorbing mechanism comprising:
- a second rod structure connected to another end relative to the first rod structure of the chassis;
- a second sleeve structure connected to a position corresponding to the second rod structure of the main body and movably sleeving the second rod structure;
- a second inner elastic part abutting against the second rod structure and the second sleeve structure respectively; and
- a second outer elastic part disposed around the second inner elastic part and located between the second sleeve structure and the second rod structure;

wherein when the second vibration-absorbing mechanism is in a first use state, the second outer elastic part is in contact with one of the second sleeve structure and the second rod structure;

when the second rod structure slides toward the second sleeve structure over the specific distance, the second vibration-absorbing mechanism switches from the first use state to the second use state, and two ends of the second outer elastic part abut against the second sleeve structure and the second rod structure respectively.

24. The stroller of claim 23, wherein the second rod structure is connected to the first rod structure for forming a U-shaped rod structure cooperatively with the first rod structure.

* * * * *